Inventor
H. W. FREEMAN
By Hiram A. Sturges
Attorney

Inventor
H. W. FREEMAN
By Hiram A. Sturges Attorney

Patented Nov. 8, 1932

1,887,348

UNITED STATES PATENT OFFICE

HENRY W. FREEMAN, OF VALLEY, NEBRASKA

TRACK PULVERIZER FOR TRACTORS

Application filed June 22, 1932. Serial No. 618,721.

This invention relates to a track pulverizer for tractors or other heavy vehicles equipped with wheels and tires similar to those used upon tractors, and has reference to an attachment for tractors which are driven upon cultivated land.

Tractors are used by farmers for listing, planting, plowing and cultivating.

If the ground is soft or damp during operation of the tractor, it becomes hardened and packed by pressure of the tractor wheels, the objectionable feature being that the depressed tracks or grooves thus formed operate as waterways and prevent uniform absorption of water furnished by rains, and this packed condition eliminates the uniform looseness of the ground which otherwise would aid vegetable growth.

The invention has for its principal object to provide plows and pulverizing-discs rearwardly and in line with the two traction wheels of the tractor for loosening and disintegrating the packed earth or tracks of said tractor wheels and to fill the depressed tracks with earth, said devices to be mounted on a frame which is secured to the rear end of the tractor.

The invention includes a pair of plows each having such form and proportions that, during operation, it will slide along beneath the surface of the packed ground of a track, the curvature of the opposed shares of a plow being such that they will not cause undue resistance to a forward movement, and also includes discs arranged in pairs for moving the earth at the sides of the tracks or depressions into said depressions, so that the surface of the ground at the rear of the wheels will be practically smooth and free from grooves or ridges.

The invention also includes a track-pulverizer which may be adjusted and used on various kinds of tractors; and it is an object of the invention to provide such a construction that few and simple parts will be required so that manufacture will be practical and moderate in expense.

With the foregoing objects in view and others to be mentioned, the invention presents a new and useful construction, combination and arrangement of parts as described herein and claimed, and as illustrated in the accompanying drawings, it being understood that changes may be made in form, size, proportion of parts and minor details, said changes being within the scope of the invention as claimed.

In the drawings, Fig. 1 is a perspective view of a track pulverizer embodying my invention, looking to the rear part of same.

Figure 3:
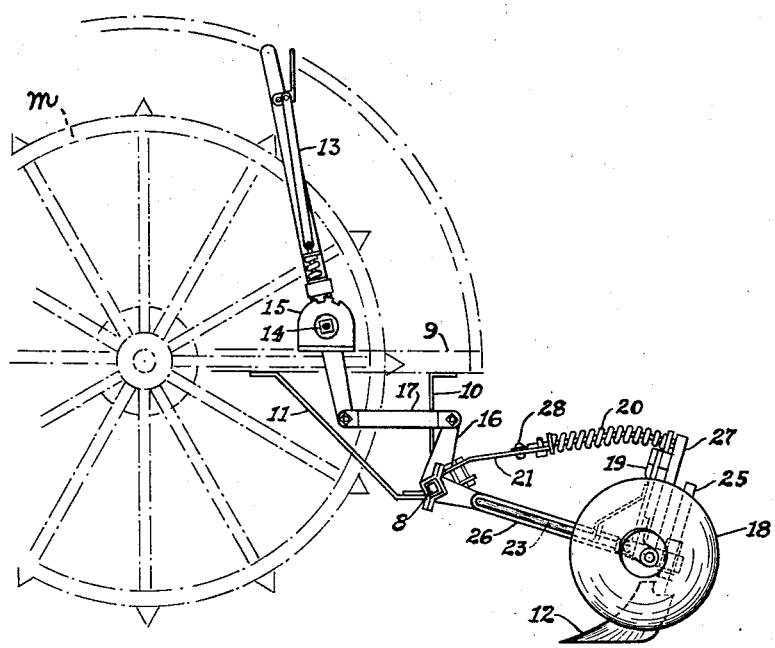
Fig. 3 is a side view of the same.

Referring now to the drawings for a more particular description, numeral 8 indicates a horizontal operating shaft, preferably angular in cross-section, said shaft being disposed near the rear end and below the platform 9 of the tractor and at right-angles to the longitudinal axis of said tractor, and supported in that position by any suitable means, the means shown herein being a pair of approximately vertical bracket-arms 10 secured at their lower ends to the shaft, their upper ends being bolted to the bottom of the platform, a second pair of bracket-arms 11 being also used, their lower ends being secured to said shaft. These comparatively long bracket-arms 11 extend forwardly from the shaft and their front ends are secured to the bottom of the platform 9 as best shown in Fig. 3 of the drawings.

Figure 1:
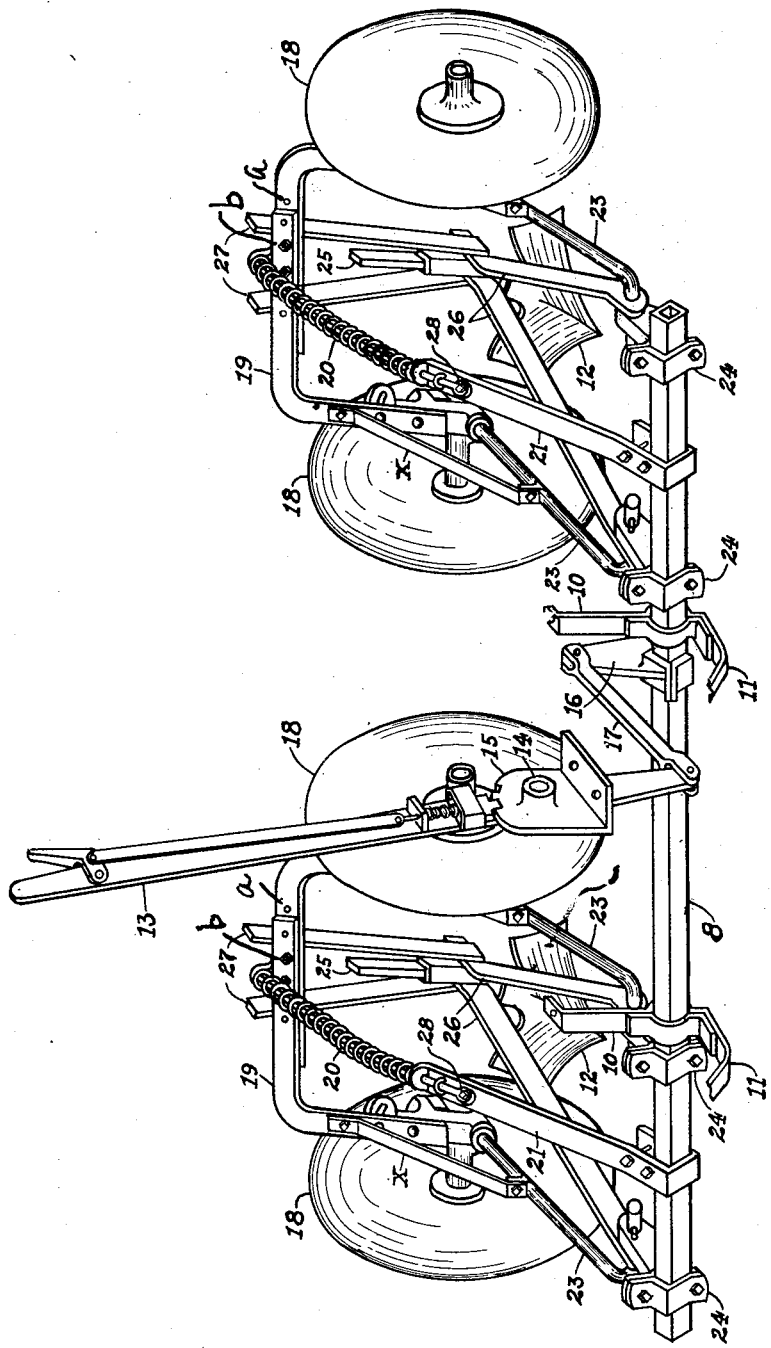
Figure 2:
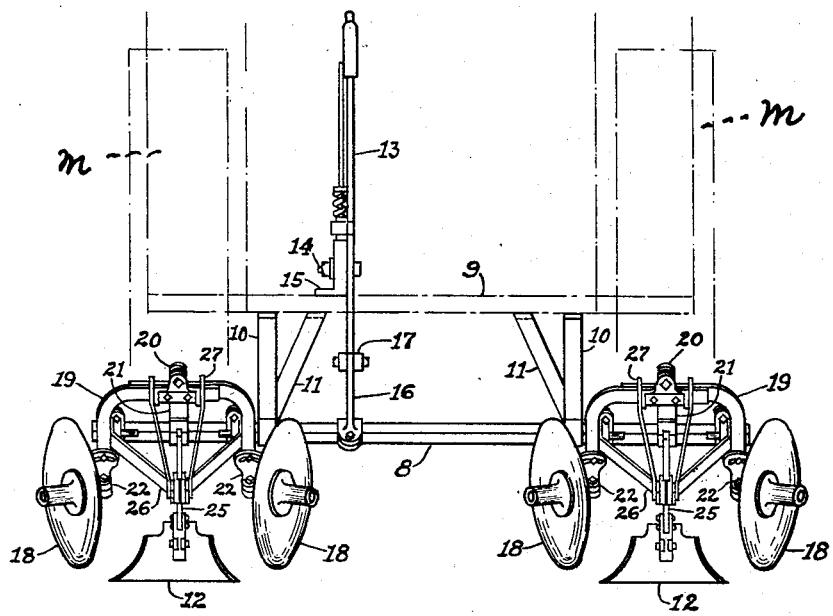
Fig. 2 is a rear view of the track pulverizer.

It will be understood that the horizontal operating shaft 8 should be maintained at a uniform and fixed distance above the ground, and that it should be adequately supported to resist stresses directed horizontally or vertically thereto, and while I have shown arms 10 and 11, any other and different means may be used for supporting the shaft 8 if desired. In Fig. 1 of the drawings the arms 11 are shown broken away.

Numerals 12 indicate a pair of plows, and in order that they may be maintained at a suitable distance below the surface of the ground during the operation of plowing and that they may be swung upwardly a suitable distance above the ground while the tractor is driven upon a highway a hand lever 13 is provided and having a pivotal mounting 14, said hand lever having a pawl adapted to engage a toothed sector 15 which is mounted on the platform 9.

Upon the shaft 8 midway between the ends thereof is rigidly secured a clamping-arm 16 and at 17 is indicated a link connected at its ends with the arm 16 and lower end of the hand lever, and it will be understood that an operator on the tractor may swing the hand lever in one direction for actuating the shaft 8 and parts mounted thereon, and may swing the hand lever in an opposite direction for lowering the plows and other parts to the ground.

In addition to the plows 12 the only other ground engaging parts are the discs 18, these being used in pairs and it will be understood that these parts which engage in the ground may encounter obstructions, and therefore resiliency should be provided to permit a yielding movement of parts, especially for the plows and discs, so that breakage of parts may be avoided, and the mounting of these parts will now be described.

Figure 4:
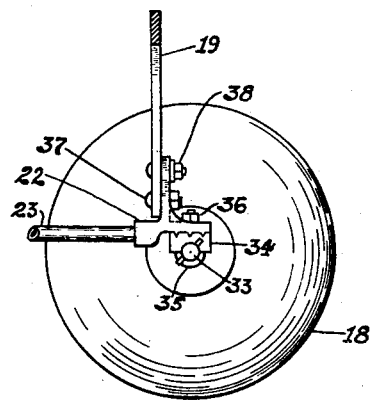
Fig. 4 is a side view of the parts shown in Fig. 5.

Numerals 19 indicate a pair of yokes of inverted U-shape, each being supported by a spring 20 which is mounted at its rear end upon the upper part of said yoke, the front end of each spring being adjustably mounted on the rear end of a lifting-bar 21 which is rigidly mounted on the shaft 8. The arms of the yokes at their lower ends are each mounted on a casting 22 as best shown in Fig. 4 of the drawings. Numerals 23 indicate supporting-links for the yokes, and braces $x$ are used for connecting the arms of the yokes in rigid relation with the supporting-links.

Each link 23 extends forwardly from a casting 22 and is pivotally mounted at its front end upon a collar 24 which is rigidly mounted on the shaft 8.

As thus described four castings 22 are used in pairs, each pair of these castings providing mountings for the lower ends of the arms of a yoke 19, and it will be seen that the weight of each yoke and parts mounted thereon will be supported by a spring 20 and lifting-bar 21. Also it will be seen that each plow 12 and pair of discs 18 are supported, for the most part, by a spring 20 and bar 21, this being a desirable feature so that any undue stresses or shocks directed to the plows or discs will not cause injury thereto.

Each plow 12 is provided with an upright shank 25. Two plow beams 26 are used for each plow, the beams 26 for each plow being mounted upon a shank 25 and extending forwardly and divergingly for pivotal mountings of their front ends upon the collars 24.

Numerals 27 indicate hangers used in pairs for supporting the plows and the plow-beams 26, the lower ends of each pair of hangers being mounted on the plow beams. The hangers of each pair extend upwardly divergent from the plow beams of a plow and their upper ends are mounted on the yoke.

The plow beams operate as draw-bars so that the plows will follow the tractor, and since the beams of each pair are disposed divergingly they tend to prevent swinging movements of the plow transversely of the line of travel and tend to maintain the plows in line with the tractor wheels $m$. Also, this last named function is discharged by the upwardly divergent bars or hangers 27.

The bars or hangers 27, of course, are depended upon to permit the yokes to support the weight of the plows 12 and plow-beams 23, and these parts may have limited rocking movements in a vertical plane subject to the control of the rigid lifting-bars 21 and springs 20.

Since the lifting-bars 21 are rigidly secured to the shaft 8, a swinging movement of the hand lever 13 will cause a swinging movement of the bars 21 for causing the plows to engage the ground or to be lifted therefrom, and the helical springs 20 may be adjusted whenever required to provide a greater or lesser resistance, bolts 28 being used for securing the front ends of the springs to the control bars 21 at longitudinal intervals thereof.

Figure 7:
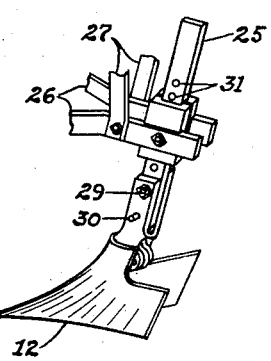
Fig. 7 is a side view of a plow, illustrating its adjustable mounting.

Means are provided for vertical adjustments of the plows longitudinally of their shanks 25, consisting of a pair of bolts 29 and 30 best shown in Fig. 7 of the drawings adapted to engage in holes 31 formed in each shank, the object in view in providing for said adjustments being the maintenance of the plows at a predetermined depth in the ground greater than the depth of the discs. The discs should enter the ground three or four inches less than that of the plows, these differences depending on the condition and character of the cultivated land.

Any suitable means may be provided for mounting the discs 18 so that they may be adjusted to suitable angles to operate effectively in filling the depressed tracks formed by the wheels of the tractor; and the mounting of said discs will now be described.

Each disc 18 is provided with a sleeve 32 which is journalled on a stub shaft or axle 33. Numeral 34 indicates a second casting or sleeve which is mounted on the axle 33. Eye bolts 35 are provided, each receiving an end-portion of a shaft or axle 33. Each eye-bolt extends through the casting or sleeve 34 and sleeve 22, and by means of a nut 36 on the threaded end of an eye-bolt the castings 22 and 34 may be pressed toward each other.

As thus described each sleeve 32 of a disc 18 may rotate freely on an axle 33, the axles and all other parts being stationary except the discs and their sleeves 32.

Figure 5:
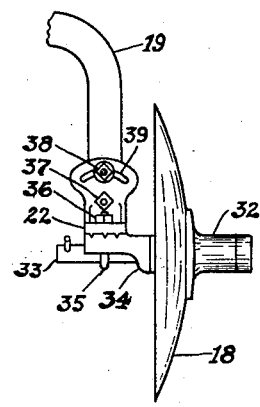
Fig. 5 is an edgewise view of one of the discs to illustrate its adjustable mounting.

By referring to Fig. 4 of the drawings it will be seen that the discs and parts last mentioned are carried by the arms of the yokes 19. Means are provided for adjusting the discs so that they will suitably move the earth into the depressions formed by the tractor wheels above mentioned. By referring to Fig. 5 which shows the parts in side elevation, it will be seen that the casting 22 is secured to an arm of a yoke 19 by a bolt 37 which traverses the arm of said yoke, a second bolt 38 being also used and disposed in a curved slot 39 which is provided for the casting 22.

It will be seen that if nuts on the bolts 37 and 38 are loosened the inclination of the axle 33 and disc thereon may be changed, the parts moving around the horizontal axis provided by the bolt 37, and this adjustment will cause the lower part of the disc 18 to engage the ground nearer to or further from a plow as may be desired; and after the nuts have been screwed down the bolts 37 and 38 will maintain the casting 22 in stationary relation with the yoke 18.

A second adjustment is also provided for the inclination of each disc 18, and this adjustment may be made by use of the vertical eye-bolt 35.

Figure 6:
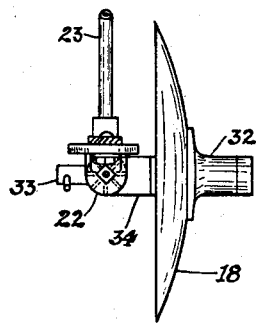
Fig. 6 is a plan view of the parts shown in Fig. 5, the yoke being in section.

It will be seen that if the nut 36 is rotated to loose position on the eye-bolt, the castings 22 and 34 may be separated or moved outwardly from each other a limited distance. It will be understood that if the engaging parts of the castings 22 and 34 are formed with rugose surfaces, or if these contacting surfaces are provided with grooves and ridges as clearly shown in Fig. 5 and as indicated by radially disposed dotted lines in Fig. 6, these features may be utilized for adjusting the parts so that the rear part of a disc 18 may be disposed nearer to or further from the plow, as may be desired for causing earth to be moved into a depressed track of a tractor, the axle 33 and disc thereon moving in an arc around a vertical axis provided by the eye-bolt 35.

After this last named adjustment has been made the nut 36 may be screwed down on the eye-bolt to prevent movements of the castings 22 and 34 relative to each other.

In operation, the plows will slide forwardly beneath the surface to loosen the packed earth in the depressed tracks. The packed earth will become thoroughly disintegrated but the depressed track will not become filled by action of a plow. Each plow will also form ridges and a groove in line with and rearwardly of a tractor wheel and unless a pair of discs are used in connection with each plow the depressed ground or track will not be filled and the action of the plow alone would provide a groove which, by action of rain, might form a small gutter or waterway. However, by use of a pair of discs outwardly of, near, and rearwardly of a plow, the ridges formed by the plow and earth at the edges of the depressed track will be moved by the discs into said depressed track, the result being that the packed earth caused by the tractor wheels will be pulverized by action of the plows and discs and the ground thus treated will be practically free from grooves or ridges.

It will be appreciated that the collars 24 may be adjusted on the shaft 8 and may be disposed at selected intervals from each other, and if the traction wheels of a tractor are disposed nearer to each other or farther apart than ordinary, said collars may be moved on the shaft for said adjustments. The yokes 19 are also adjustable to occupy a lesser or greater space between the discs 18; the arms of each yoke being provided at their junction with holes $a$, at intervals, for receiving bolts $b$.

I claim as my invention,—

1. In a ground pulverizer for the depressed tracks of tractor wheels, a shaft at the rear of the tractor and attached thereto, a pair of yokes rearwardly of and having forwardly extending links pivotally connected with said shaft, spring controlled lifting-bars connecting the yokes with said shaft, a pair of plows carried by the yokes and having beams pivotally connected with said shaft, discs arranged in pairs at the sides of the plows and carried by said yokes, and a movable hand lever on the tractor for moving the shaft in an arc for moving said plows and discs in a vertical plane.

2. In a ground pulverizer for the depressed tracks of tractor wheels, a shaft rearwardly of and attached to the tractor, a pair of yokes of inverted U-shape each arm of a yoke having a forwardly extending link pivotally connected with said shaft, a pair of plows each rigidly attached to a yoke and having a plow beam pivotally connected with said shaft, discs arranged in pairs at the sides of the plows and mounted on said yokes, a pair of lifting-bars each rigidly mounted on the shaft and having a resilient element connected with a yoke, a pivotally mounted hand lever, and devices connecting the hand lever with the shaft whereby rocking movements of said lever may cause rocking movements of said plows and said discs in a vertical plane.

3. In a ground pulverizer for the depressed tracks of tractor wheels, a shaft rearwardly of and connected with the tractor, a pair of yokes rearwardly of the shaft, each yoke having links rigidly mounted on its arms with pivotal mountings on said shaft, a pair of plows each disposed rearwardly of and in line with a tractor wheel and having beams pivotally connected with said shaft, means for rigidly connecting the plow beams with said yokes, a pair of spring-controlled lifting-bars each rigidly mounted on said shaft and connected with a yoke, a hand-lever mounted on the tractor and connected with the shaft, said hand-lever being movable in one direction for moving the plows and discs downwardly in a circle's arc, said lever being movable in a reverse direction for moving said plows and disc upwardly in a circle's arc.

4. In a ground pulverizer for depressed tracks of tractor wheels, a shaft disposed rearwardly of and at right-angles to the longitudinal axis of a tractor and connected with said tractor, a pair of yokes of inverted U-shape at the rear of the tractor and having links pivotally mounted on said shaft, a pair of plows each being disposed rearwardly of and in line with a tractor wheel and having plow-beams pivotally connected with said shaft, hangers mounted on the yokes and rigidly connected with said plows, a pair of spring-controlled lifting-bars each rigidly mounted on said shaft and connected with a yoke, a plurality of discs arranged in pairs at the sides of the plows and mounted on said yokes, and means on the tractor and connected with the shaft adapted to be moved for moving the plows and said discs.

5. In a ground pulverizer for depressed tracks of tractor wheels, a shaft rearwardly of and connected with the tractor, a pair of yokes rearwardly of the tractor and having links pivotally connected with said shaft, a pair of plows each disposed rearwardly in line with a tractor wheel and provided with an upright shank, upwardly divergent hangers arranged in pairs, each pair being rigidly connected with a plow and mounted at their upper ends on a yoke, plow-beams arranged in pairs, each pair being mounted on the shank of a plow and extending forwardly divergent for pivotal connections with said shaft, discs mounted on said yokes and disposed at the sides of the plows, spring-controlled lifting-bars rigidly mounted on the shaft and connected with the yokes, and means on the tractor connected with the shaft for actuating said shaft to cause actuation of said plows and said discs.

6. In a track pulverizer for a tractor, a pair of plows each connected with the tractor and adapted to engage the ground to form a furrow and pair of ridges rearwardly and in the line of travel of a tractor wheel, and a plurality of discs connected with the tractor and arranged in pairs, each pair of discs being disposed near the sides of a plow for moving said ridges into said furrow.

7. In a ground pulverizer for the tracks of tractor wheels, a horizontal shaft disposed rearwardly of and at right-angles to the longitudnal axis of the tractor and attached thereto, a pair of yokes, links rigidly mounted on the yokes and extending forwardly for pivotal mountings on the shaft, resiliently controlled lifting-bars rigidly mounted on the shaft and connected with the yokes, a pair of plows each disposed rearwardly of the shaft in line with a tractor wheel and provided with an upright shank, plow-beams arranged in pairs, each pair of beams being mounted on a shank of a plow and extending forwardly-divergent for pivotal connections with said shaft, discs carried by the yokes and having journalled bearings at the sides of the plows, and means on the tractor connected with the shaft for elevating and lowering said plows and said discs.

8. In a ground pulverizer for the tracks of tractor wheels, a shaft rearwardly of the tractor and attached thereto, a pair of upright yokes rearwardly of and having links pivotally connected with said shaft, discs carried by said yokes, a pair of upright plow shanks, plow-beams arranged in pairs, each pair of beams being secured to a plow-shank and extending divergently to and pivotally connected with said shaft, hangers connecting the plow-beams with the yokes, a pair of plows each disposed in line with a tractor wheel and having a mounting upon and arranged to be adjusted longitudinally of an upright plow-shank, resiliently controlled lifting-bars rigidly mounted on the shaft and connected with the yokes, and means on the tractor having a connection with the shaft for actuating said shaft, said plows and said discs.

9. In a ground pulverizer for the tracks of tractor wheels, a shaft at the rear of the tractor and mounted thereon, means on the tractor and connected with the shaft for rotating said shaft in a circle's arc, a pair of plows each disposed rearwardly and in line with a tractor wheel, discs arranged in pairs at the sides of the plows, and co-operating devices connecting the plows and discs with the shaft whereby the movements of the shaft will cause coincident swinging movements of said plows and discs.

In testimony whereof, I affix my signature.
HENRY W. FREEMAN.